US 11,478,945 B2

(12) United States Patent
Burgoa

(10) Patent No.: US 11,478,945 B2
(45) Date of Patent: Oct. 25, 2022

(54) UNDERWATER LINE CUTTING TOOL

(71) Applicant: Naval Information Warfare Center Pacific, San Diego, CA (US)

(72) Inventor: Robert David Burgoa, El Cajon, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/210,996

(22) Filed: Mar. 24, 2021

(65) Prior Publication Data
US 2022/0305686 A1    Sep. 29, 2022

(51) Int. Cl.
*B26D 1/26* (2006.01)
*B26D 7/26* (2006.01)
*B25J 15/00* (2006.01)
*B26D 1/00* (2006.01)

(52) U.S. Cl.
CPC ............ *B26D 1/26* (2013.01); *B25J 15/0019* (2013.01); *B26D 1/0006* (2013.01); *B26D 7/2614* (2013.01); *B26D 2001/002* (2013.01)

(58) Field of Classification Search
CPC ...... B26D 1/26; B26D 1/0006; B26D 7/2614; B26D 2001/002; B25J 15/0019; B26B 3/00; B26B 5/00; B26B 9/00; B26B 13/26; B63C 11/52; E02D 9/04; B63G 2008/007; B63G 8/001; E21B 41/04; Y10S 83/928
USPC .................................................. 30/251, 249
See application file for complete search history.

(56) References Cited

U.S. PATENT DOCUMENTS

| 1,553,449 | A | * | 9/1925 | Kennedy | B26B 27/005 30/294 |
| 3,056,267 | A | * | 10/1962 | McRee | E02D 9/005 144/34.1 |
| 3,270,787 | A | * | 9/1966 | Lennart | A01G 23/087 144/34.5 |
| 3,445,931 | A | * | 5/1969 | Knudson | B26B 3/00 30/294 |
| 3,667,515 | A | * | 6/1972 | Corey | E02D 9/04 144/34.5 |
| 3,719,116 | A | * | 3/1973 | Burton | B63G 8/001 348/81 |
| 4,261,399 | A | * | 4/1981 | Hawkins | B27M 1/00 144/34.5 |
| 4,452,286 | A | * | 6/1984 | Menzi | A01G 23/087 144/34.1 |
| 4,558,515 | A | * | 12/1985 | LaBounty | B23D 17/00 144/34.5 |
| 4,641,694 | A | * | 2/1987 | Rohde | B27L 7/00 144/195.1 |
| 4,771,540 | A | * | 9/1988 | LaBounty | B23D 17/00 144/345 |

(Continued)

*Primary Examiner* — Jonathan G Riley
(74) *Attorney, Agent, or Firm* — Naval Information Warfare Center, Pacific; Kyle Eppele; Matthew D. Pangallo

(57) ABSTRACT

An underwater line cutting tool includes a cutter. The cutter includes a blade holder and a rotating manipulator arm. The blade holder includes two stationary arms in a V-shaped configuration including at least one blade attached to one of two stationary arms. The blade holder is attached to the rotating manipulator arm of a rotating manipulator that is attached to an underwater remotely operated vehicle.

12 Claims, 16 Drawing Sheets

(56) References Cited

U.S. PATENT DOCUMENTS

| | | | | |
|---|---|---|---|---|
| 4,802,517 | A * | 2/1989 | Laster | A01G 23/087 114/151 |
| 5,139,006 | A * | 8/1992 | Trudeau | E02D 9/005 125/12 |
| 6,691,416 | B2 * | 2/2004 | Yu Chen | B26B 3/00 30/294 |
| 7,351,010 | B1 * | 4/2008 | Kelly | F16L 1/166 405/158 |
| 8,096,334 | B2 * | 1/2012 | Milne | A01G 23/087 144/34.1 |
| 2003/0010404 | A1 * | 1/2003 | Mossman | A01G 23/08 144/335 |
| 2005/0102844 | A1 * | 5/2005 | Addis | B26B 29/025 30/294 |
| 2005/0141964 | A1 * | 6/2005 | Tomlinson | E02D 3/10 405/50 |
| 2005/0193564 | A1 * | 9/2005 | Trbovich | B26B 3/00 30/115 |
| 2005/0223564 | A1 * | 10/2005 | Hanson | B26B 3/00 30/172 |
| 2007/0044322 | A1 * | 3/2007 | Trbovich, Jr. | B26B 3/00 30/294 |
| 2017/0282263 | A1 * | 10/2017 | Khoury | B23D 31/008 |
| 2018/0185049 | A1 * | 7/2018 | Gowski | A61B 17/320016 |
| 2021/0213644 | A1 * | 7/2021 | Trudeau | E02D 9/04 |

* cited by examiner

UNDERWATER LINE CUTTING TOOL

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Remotely operated vehicles (ROVs) are unoccupied underwater vehicles that are operated by an individual from the surface (e.g., a boat, platform, or land). These vehicles are operated using controls that are electrically connected from the vehicle to the surface through a group of tether cables. ROVs have the capability to extend a thousand yards from the surface, depending on the length of the tether cables and the currents in the specific dive area. The tether cables can vary in size and type of material depending on the size of the vehicle, the length of the tether cable, the power requirements of the ROV, location of power supply for the ROV, and the current in the dive area. ROVs are useful in military, scientific, videography, and personal use applications.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Figure 1A:
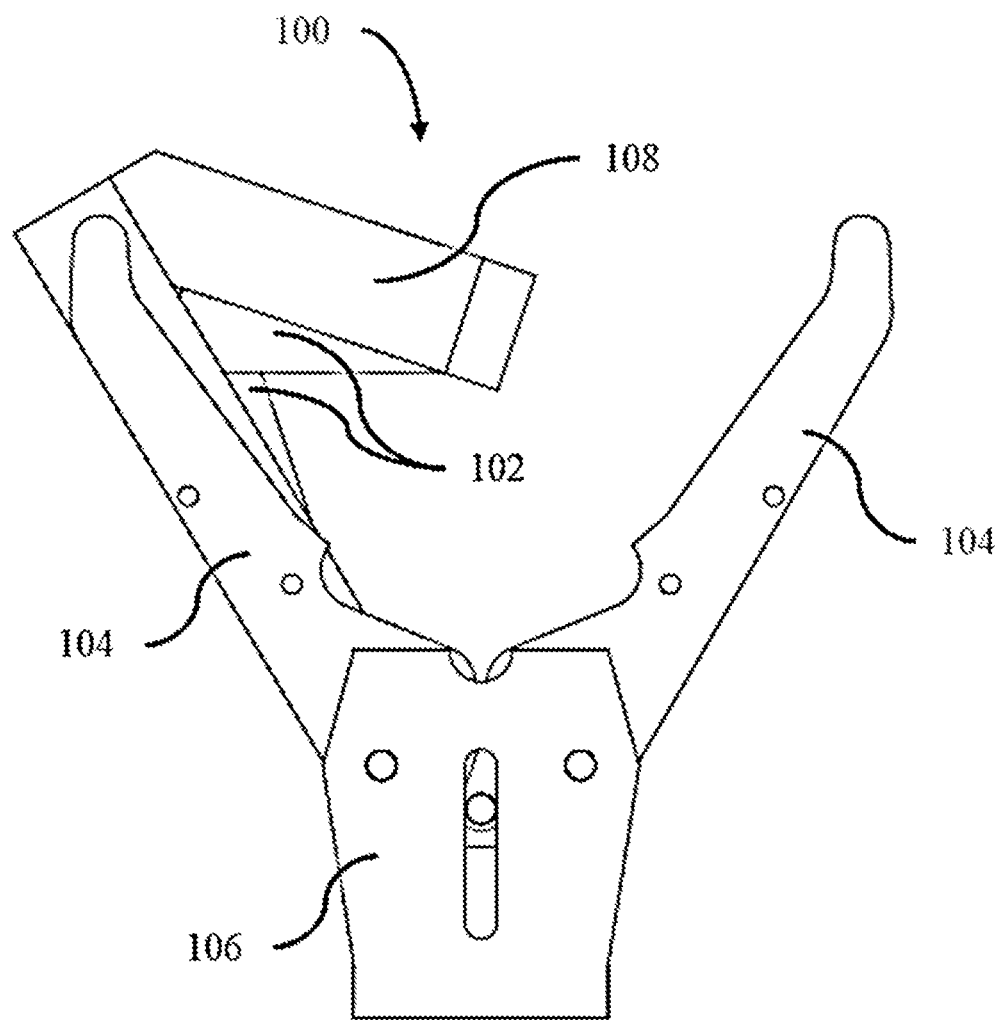
FIGS. 1A and 1B are a top view and a perspective view of an example of an open rotating manipulator with a cutter attached to one of the rotating manipulator arms, respectively.

Underwater lines may become entangled due to underwater currents or the length of the line depending on the application. Some of these underwater lines include fishing lines (e.g., fishing pot lines, fishing trap lines, etc.), parachute lines, ROV tether lines, or any other underwater line that may become entangled. In particular, when these lines become loose underwater, the lines are difficult to cut. In addition, the material of the lines can make them even more challenging to cut, such as ultra-high-molecular-weight polyethylene (HMPE) lines.

In an example, a ROV can be equipped with an underwater line cutting tool and sent underwater to an entangled underwater line to cut the line to free any entangled object. However, many current underwater line cutting tools available to ROVs fail to cut the underwater lines. This is because, in some situations, the underwater line cannot be corralled into the blade or held steady due to currents causing the underwater line to sway. In addition, many cutting tools use a linear actuator to press a blade against the underwater line to cut the line. As a result, some cutting tools do not have enough force to cut thicker underwater lines or cut through more durable underwater line material.

The underwater cutting tool described herein is capable of being attached to an existing attachable ROV rotating manipulator arm (i.e., a plier-like tool) or as a separate attachment directly to the ROV rotating manipulator as one of the arms. The cutting tool has a unique V-shaped configuration that is capable of corralling and steadying an underwater line (e.g., a tether line) to cut it. In addition, the underwater cutting tool used herein uses the force from the ROV's thrust moving away from the underwater line to cut the underwater line rather than a linear actuator. As a result, the ROV reduces the chance of entanglement while cutting the underwater line since the ROV is moving away from the underwater line during and after cutting the line. This allows the underwater cutting tool herein to cut underwater lines as large as 1 inch in diameter as well as underwater lines composed of high strength polymers.

In one example, an underwater line cutting tool is disclosed herein that includes a cutter. The cutter includes a blade holder and a rotating manipulator arm. The blade holder includes two stationary arms in a V-shaped configuration including at least one blade attached to one of two stationary arms. The blade holder is attached to the rotating manipulator arm of a rotating manipulator that is attached to an underwater remotely operated vehicle.

In another example, an underwater line cutting tool is disclosed herein that includes a cutter. The cutter includes a blade pocket, a connector, and a blade cover. The blade pocket includes two pocket arms in a V-shaped configuration, a pocket arm attachment port at an end of one of the two pocket arms, and at least one blade attached to the blade pocket. The connector includes two casing arms in a V-shaped configuration with a casing arm attachment port at an end of one of the two casing arms. The connector is attached to the blade pocket. The blade cover includes two stationary arms in a V-shaped configuration. The blade cover is located within the connector and attached to the blade pocket, thereby attaching the at least one blade to the blade pocket The casing arm attachment port and the pocket arm attachment port are located parallel to each other at the same end of casing arm and pocket arm, respectively. The cutter attaches directly to a rotating manipulator as one of the arms of the rotating manipulator that is attached to an underwater ROV.

Figure 1B:
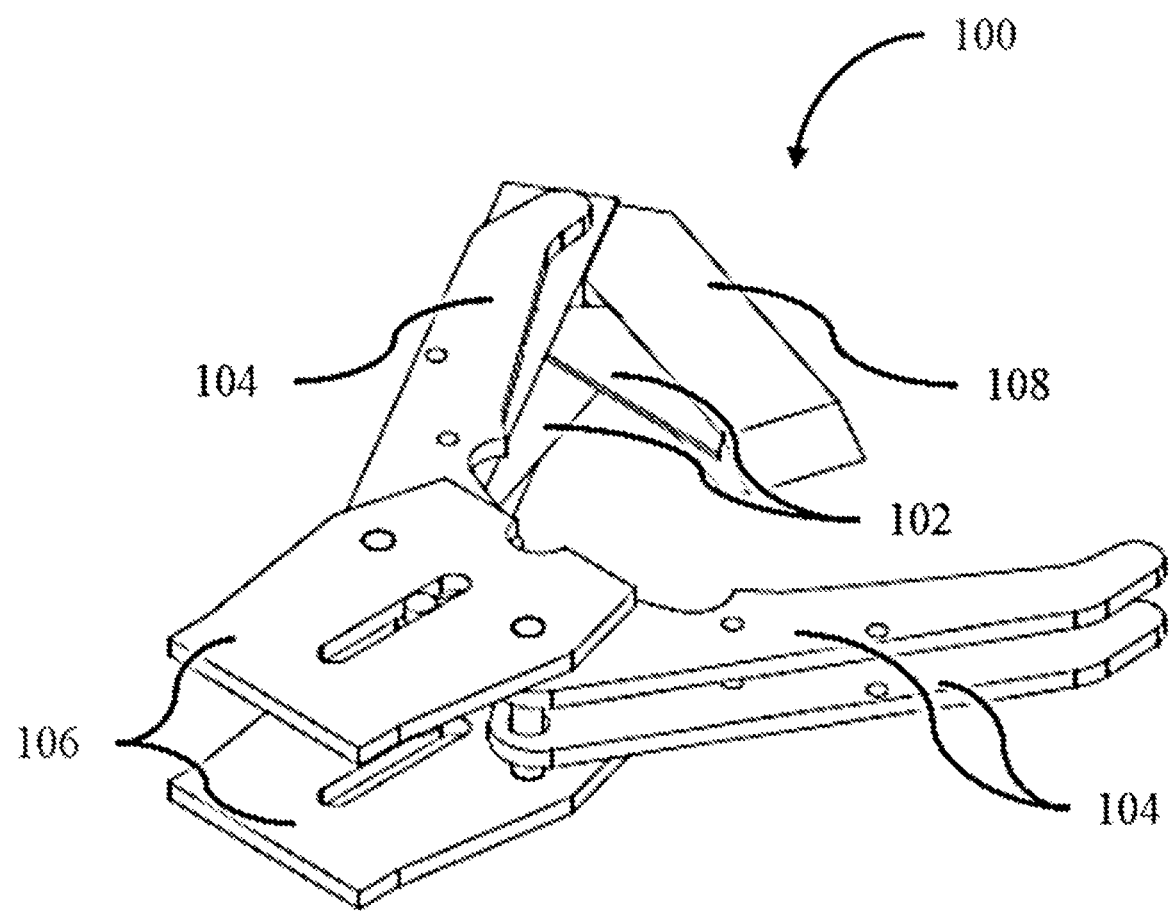

Referring now to FIGS. 1A and 1B, a blade holder 108 is used, which includes at least one blade 102 attached to the blade holder 108. The blade 102 or blades 102 may be attached through blade adjusting threads (not shown in FIGS. 1A and 1B) in the blade holder 108. The blade holder 108 may be attached to a rotating manipulator arm 104 through additional adjusting threads on the blade holder 108

(also not shown in FIGS. 1A and 1B). In an example, the blade adjusting threads and additional adjusting threads on the blade holder 108 are threads for screws to attach each component. The rotating manipulator arm 104 with the blade holder 108 is attached to an ROV with a rotating manipulator attachment 106. In an example, the blade holder 108 is attached to the left rotating manipulator arm in FIGS. 1A and 1B. In another example, the blade holder 108 may also be attached to the right rotating manipulator arm. The blade holder 108 may be made from any material capable of being 3D printer. Some examples include material selected from the group consisting of high-density polyethylene, aluminum, titanium, stainless steel, polyvinyl chloride, acrylonitrile butadiene styrene, and combinations thereof. The blades 102 may be any blades capable of cutting an underwater line with a diameter equal to or greater than 1 inch or an underwater line made from ultra-high-molecular-weight polyethylene (HMPE). An example includes general utility blades. In another example, the blades may be a single edge razor blades, hook blades, titanium hook knives, general utility blades, and combinations thereof.

In FIGS. 1A and 1B, an open rotating manipulator 100 with a blade holder 108 attached to the rotating manipulator arm 104 is shown. The open rotating manipulator 100 attaches to an ROV. In this example, the open rotating manipulator 100 has a left rotating manipulator arm 104 with a blade holder 108 and a second rotating manipulator arm 104 without a blade holder 108. In another example, the blade holder 108 may be attached to either rotating manipulator arm 104. The blades 102 are attached to the blade holder 108. In the example in FIGS. 1A and 1B, two blades 102 are used. In another example, the open rotating manipulator 100 may include a third blade attached to the second rotating manipulator arm 104 without the blade holder 108 that would push an underwater line towards the two blades on the blade holder 108 when the rotating manipulator is moved to a closed position. Both of the rotating manipulator arms 104 are attached to a rotating manipulator attachment 106, which secures the open rotating manipulator 100 to the ROV. In this example, the open rotating manipulator 100 can be used with the ROV underwater. The open rotating manipulator 100 attached to the ROV will maneuver until an underwater line is between both rotating manipulator arms 104. Once the underwater line is between both rotating manipulator arms 104, the open rotating manipulator 100 would switch to a closed position.

Figure 2A:
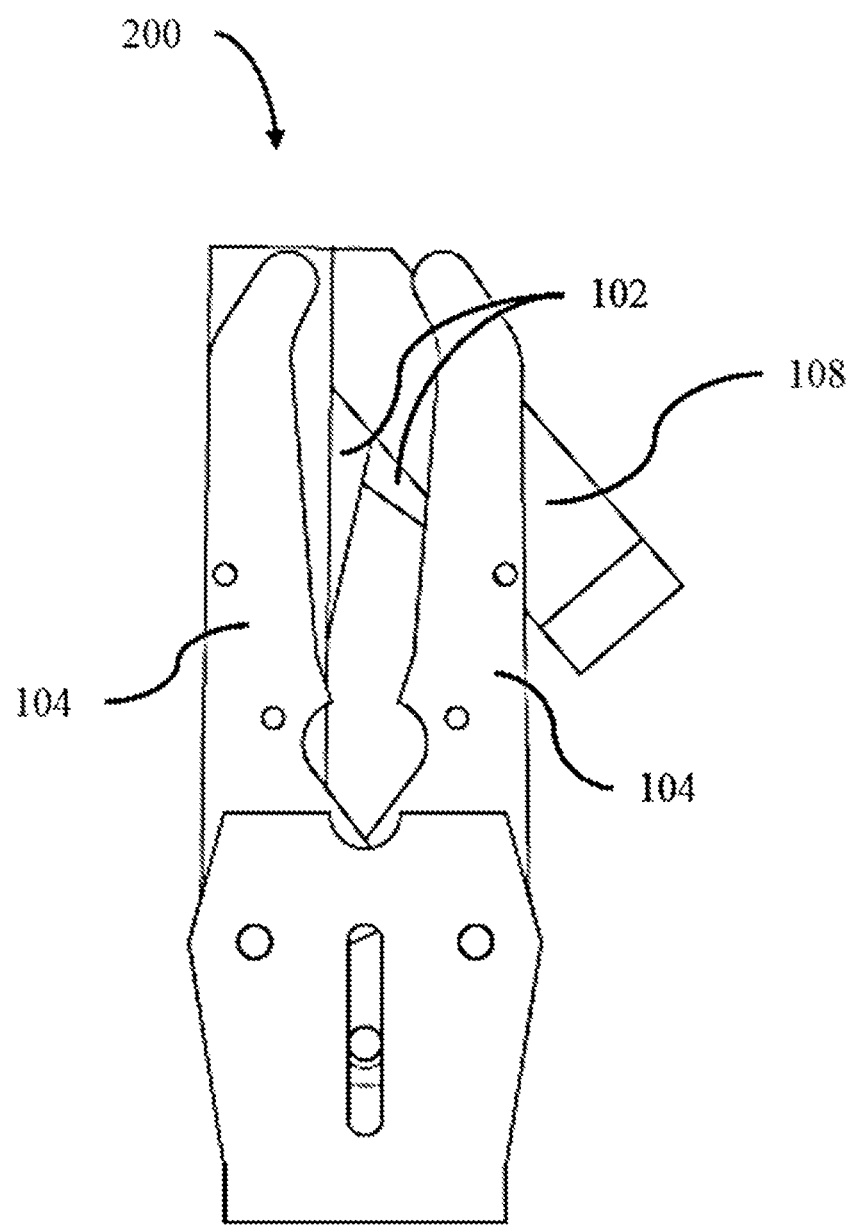
FIGS. 2A and 2B are a top view and a perspective view of an example of a closed rotating manipulator with a cutter attached to one of the rotating manipulator arms, respectively.
Figure 2B:
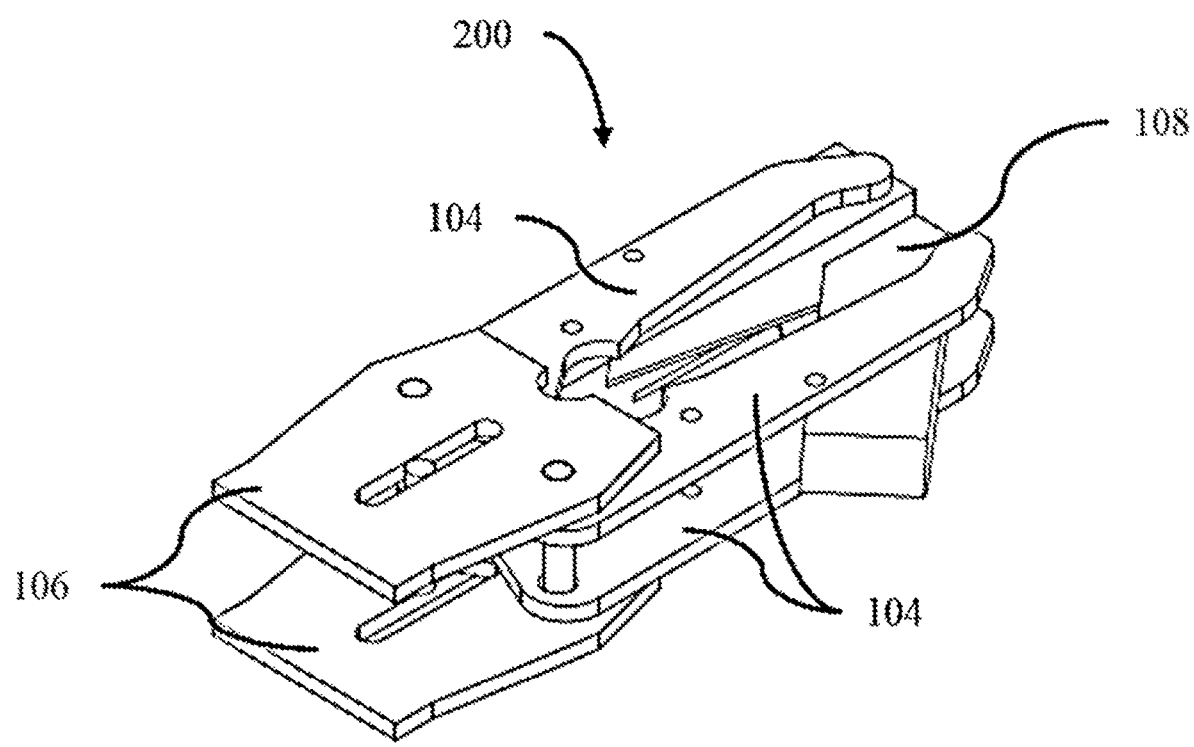

In FIGS. 2A and 2B, the closed rotating manipulator 200 is shown. The blade holder 108 is attached to a rotating manipulator arm 104 of a closed rotating manipulator 200. In this example, the closed rotating manipulator 200 has a left rotating manipulator arm 104 with a blade holder 108 and a second rotating manipulator arm 104 without a blade holder 108. In another example, the blade holder 108 may be attached to either rotating manipulator arm 104. Similar to FIGS. 1A and 1B, the closed rotating manipulator 200 includes two blades 102 (shown only in FIG. 3A) attached to the blade holder 108. The closed rotating manipulator 200 may include a third blade attached to the second rotating manipulator arm 104 without the blade holder 108 attached that would push an underwater line towards the two blades 102 on the blade holder 108 when the rotating manipulator is moved to a closed position. Again, both of the rotating manipulator arms 104 are attached to a rotating manipulator attachment 106, which attaches the closed rotating manipulator 200 to the ROV. In this example, the closed rotating manipulator 200 secured to the ROV is enclosed around an underwater line, which is positioned between the two rotating manipulator arms 104. The ROV would then use thrusters to move away from the underwater line to pull the blades 102 against the underwater line until the line is cut.

Figure 3A:
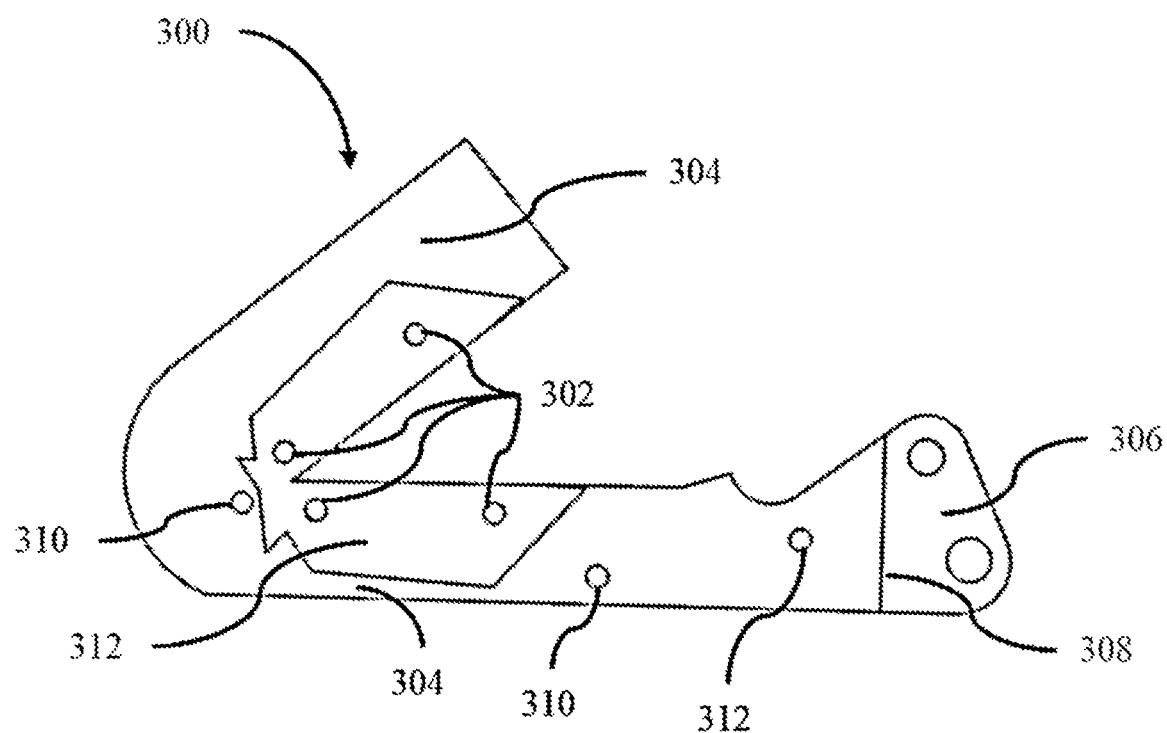
FIGS. 3A and 3B are a top view and a perspective view of an example of a blade pocket, respectively.
Figure 3B:
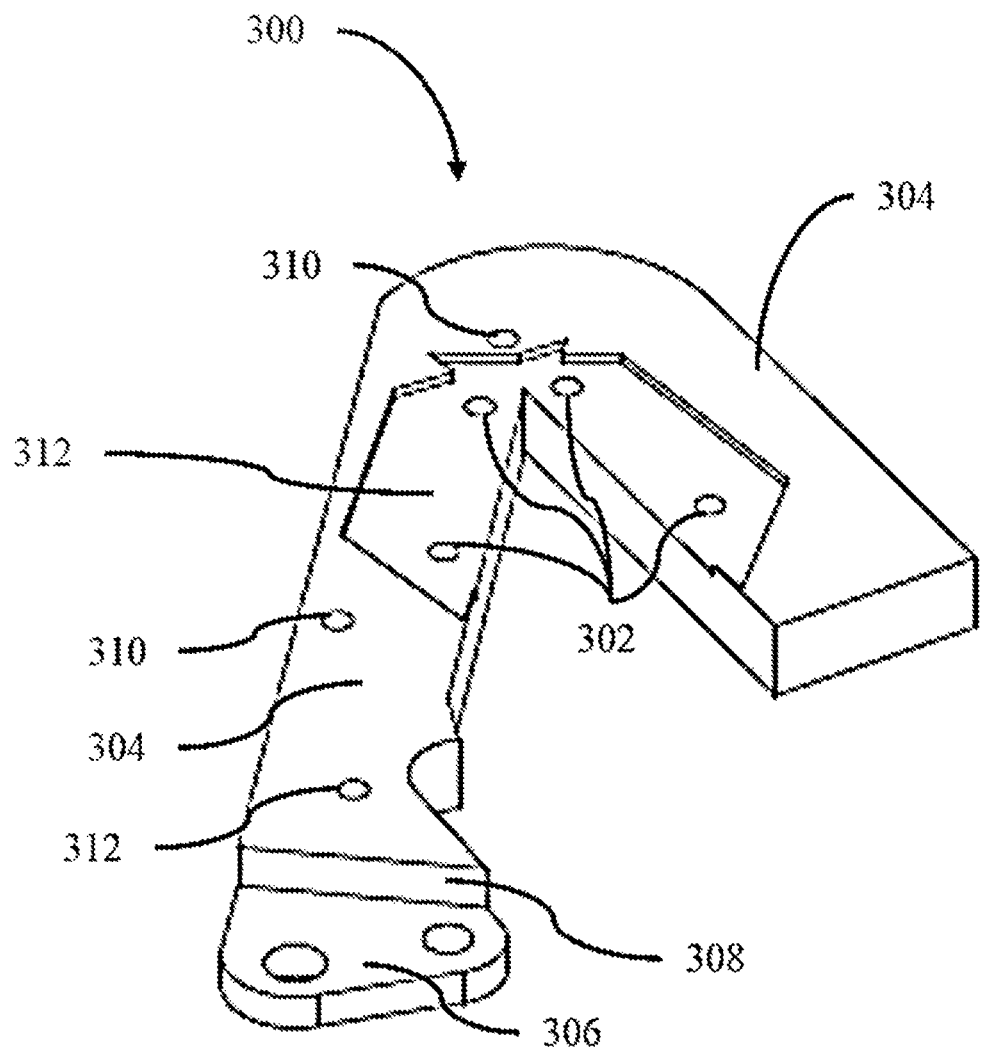

Referring now to FIGS. 3A and 3B, a top view and a perspective view of an example of a blade pocket 300 is shown. The blade pocket 300 includes two pocket arms 304 in a V-shaped configuration and a pocket arm attachment port 306 at an end 308 of one of the two pocket arms 304. The blade pocket 300 includes at least one blade 102 that is attached to the blade pocket 300 in the blade grove 312 using the blade attachment threads 302 to attach the blade 102. In an example, the blade 102 is attached to the blade pocket 300 using screws that fit into the blade attachment threads 302. The blade pocket 300 also includes blade cover attachment threads 310 and a connector attachment thread 312. The connector attachment thread 312 allows the blade pocket 300 to attach to the connector 400, which is discussed in greater detail below. The blade cover attachment threads 310 allow the blade pocket 300 to attach to the blade cover 500, which is also discussed in greater detail below. The threads shown in the pocket arm attachment port 306 allow the cutter to be attached to the rotating manipulator attachment 106 as one of the arms of the rotating manipulator, which is then attached to an ROV. The blades 102 may be the same blades as previously described herein for FIGS. 1A and 1B.

The pocket arm attachment port 306 can be on the bottom or top half of the end 308 of the pocket arm 304. When the pocket arm attachment port 306 is on the bottom half of the end 308 of the pocket arm 304 (as shown in FIGS. 3A and 3B), the blade pocket 300 forms the bottom portion of the cutter (i.e., the left rotating manipulator arm of the rotating manipulator). When the pocket arm attachment port 306 is on the top half of the end 308 of the pocket arm 304, the blade pocket 300 forms the top portion of the cutter (i.e., the right rotating manipulator arm of the rotating manipulator).

Figure 4A:
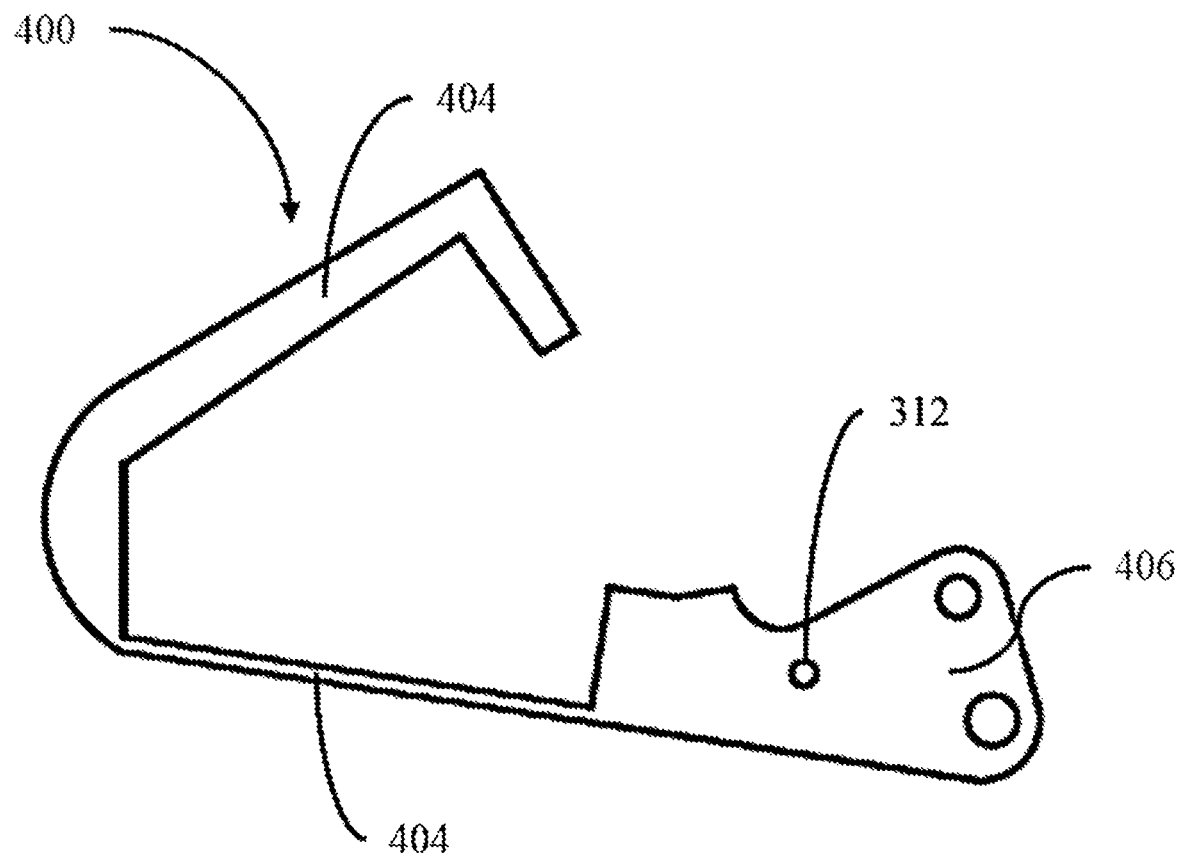
FIGS. 4A and 4B are a top view and a perspective view of an example of a connector, respectively.
Figure 4B:
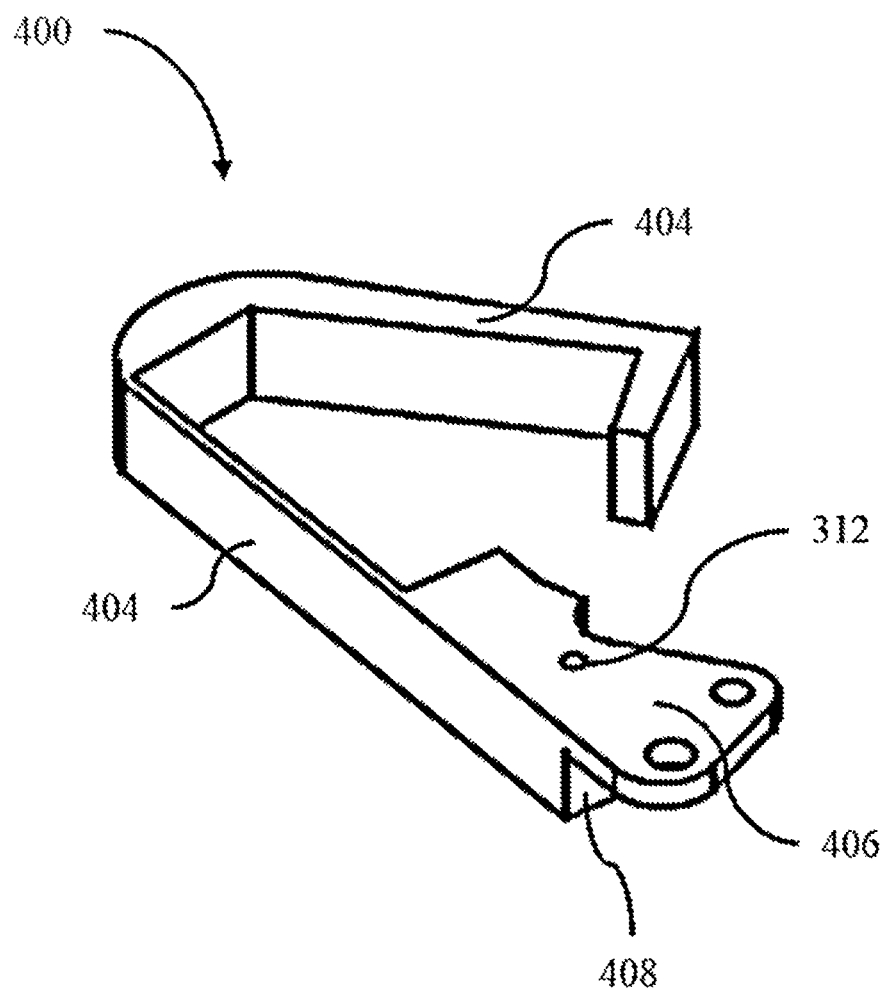

Referring now to FIGS. 4A and 4B, a top view and a perspective view of an example of a connector 400 is shown. The connector 400 includes two casing arms 404 in a V-shaped configuration and a casing arm attachment port 406 at an end 408 of one of the two casing arms 404. The connector 400 is attached to the blade pocket 300 through the connector attachment thread 312. In an example, the connector 400 is attached to the blade pocket 300 using a screw that fits into the connector attachment thread 312. The threads shown in the casing arm attachment port 406 allow the cutter to be attached to the rotating manipulator attachment 106 as one of the rotating manipulator arms, which is then attached to an ROV.

The casing arm attachment port 406 can be on the bottom or top half of the end 408 of the casing arm 404. When the casing arm attachment port 406 is on the bottom half of the end 408 of the casing arm 404, the connector 400 forms the bottom portion of the cutter (i.e., the right rotating manipulator arm of the rotating manipulator). When the casing arm attachment port 406 is on the top half of the end 408 of the casing arm 404 (shown in FIGS. 4A and 4B), the connector 400 forms the top portion of the cutter (i.e., the left rotating manipulator arm of the rotating manipulator).

Figure 5A:
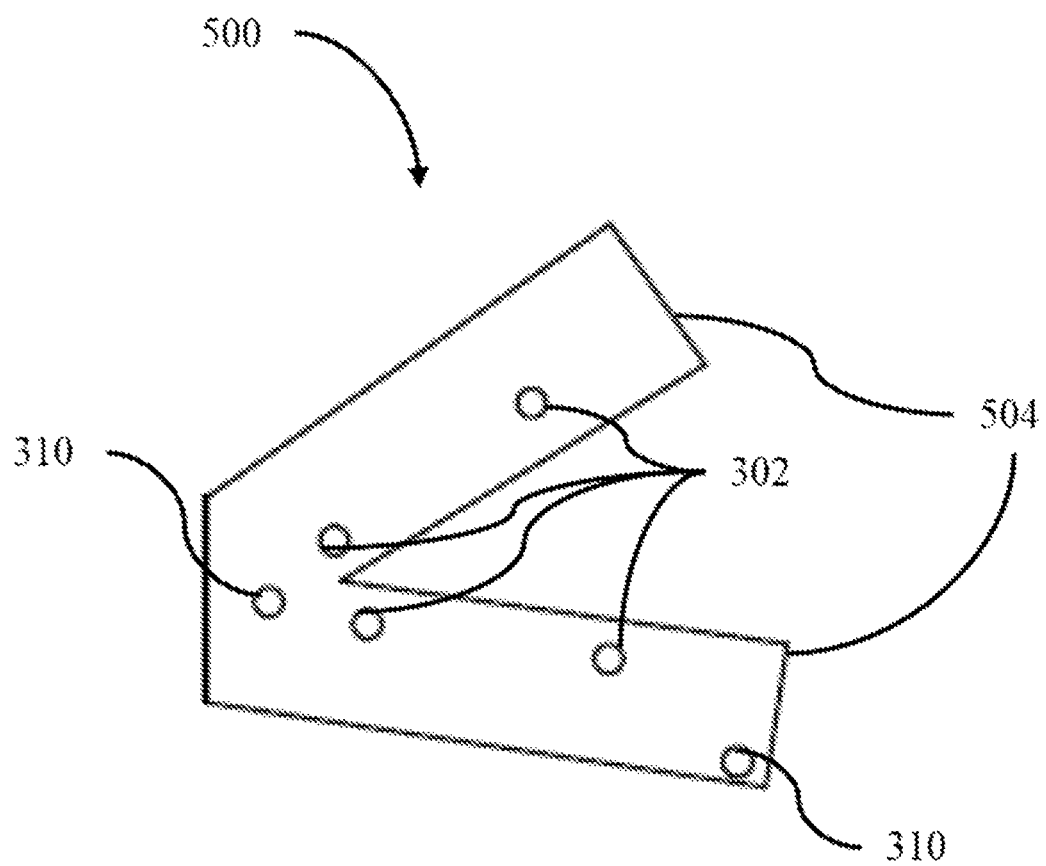
FIGS. 5A and 5B are a top view and a perspective view of an example of a blade cover, respectively.
Figure 5B:
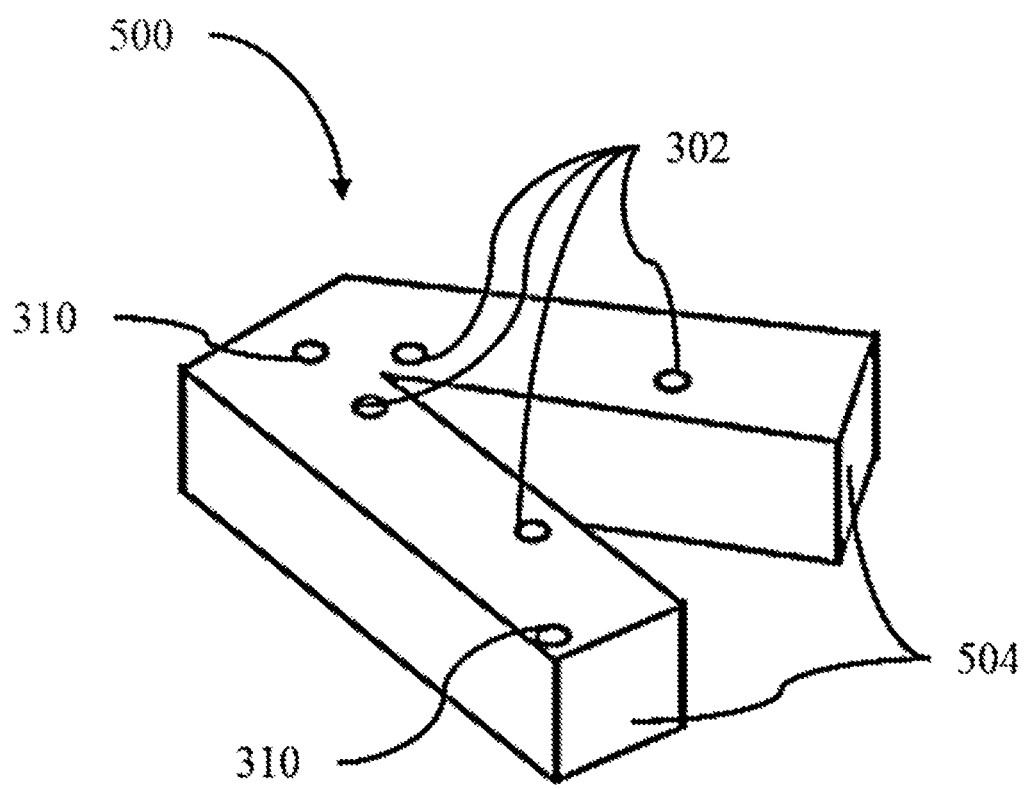

Referring now to FIGS. 5A and 5B, a top view and a perspective view of an example of a blade cover 500 is shown. The blade cover 500 includes two stationary arms 504 in a V-shaped configuration. The blade cover 500 fits within the connector 400 in the open space shown in FIGS. 4A and 4B. The blade cover 500 attaches the at least one blade 102 to the blade pocket 400 through the blade attachment threads 302. In the example shown in FIGS. 5A and 5B, the blade cover 500 includes blade attachment threads 302 for two blades. Additionally, the blade cover 500 includes blade cover attachment threads 310 that attach the blade cover 500 to the blade pocket 400. In an example, the blades 102 and the blade cover 500 are attached to the blade pocket 400 by using screws that fit through the blade attachment threads 302 and the blade cover attachment threads 310.

Figure 6A:
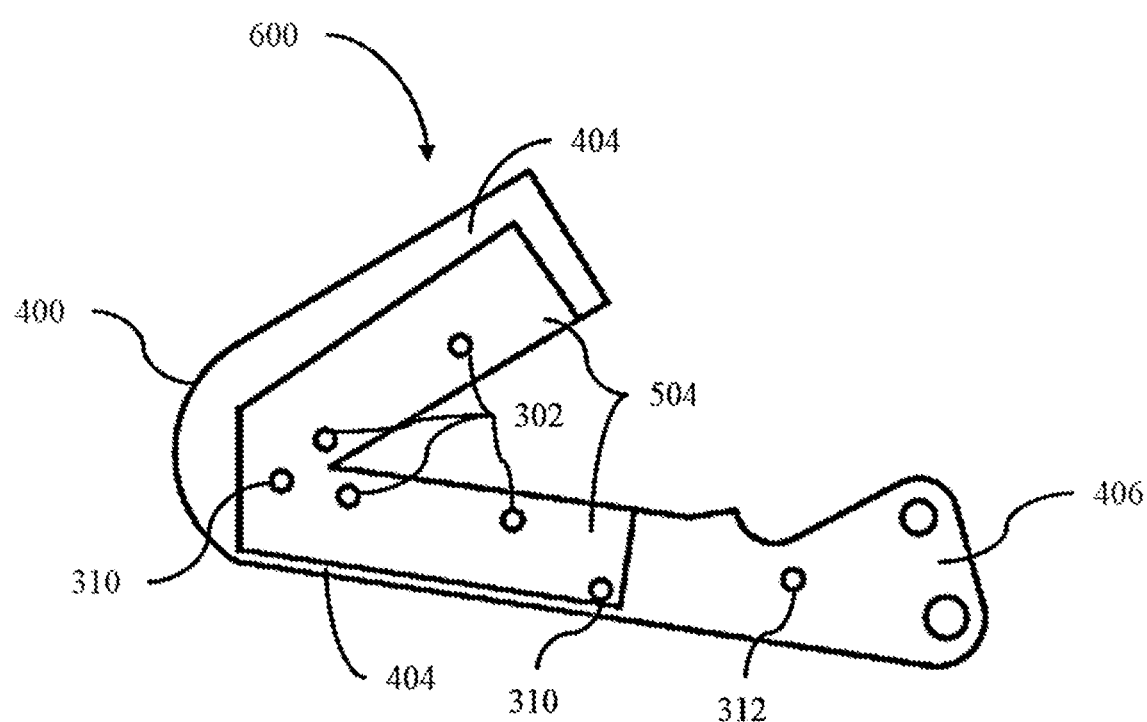
FIGS. 6A and 6B are a top view and a perspective view of an example of a cutter, respectively.
Figure 6B:
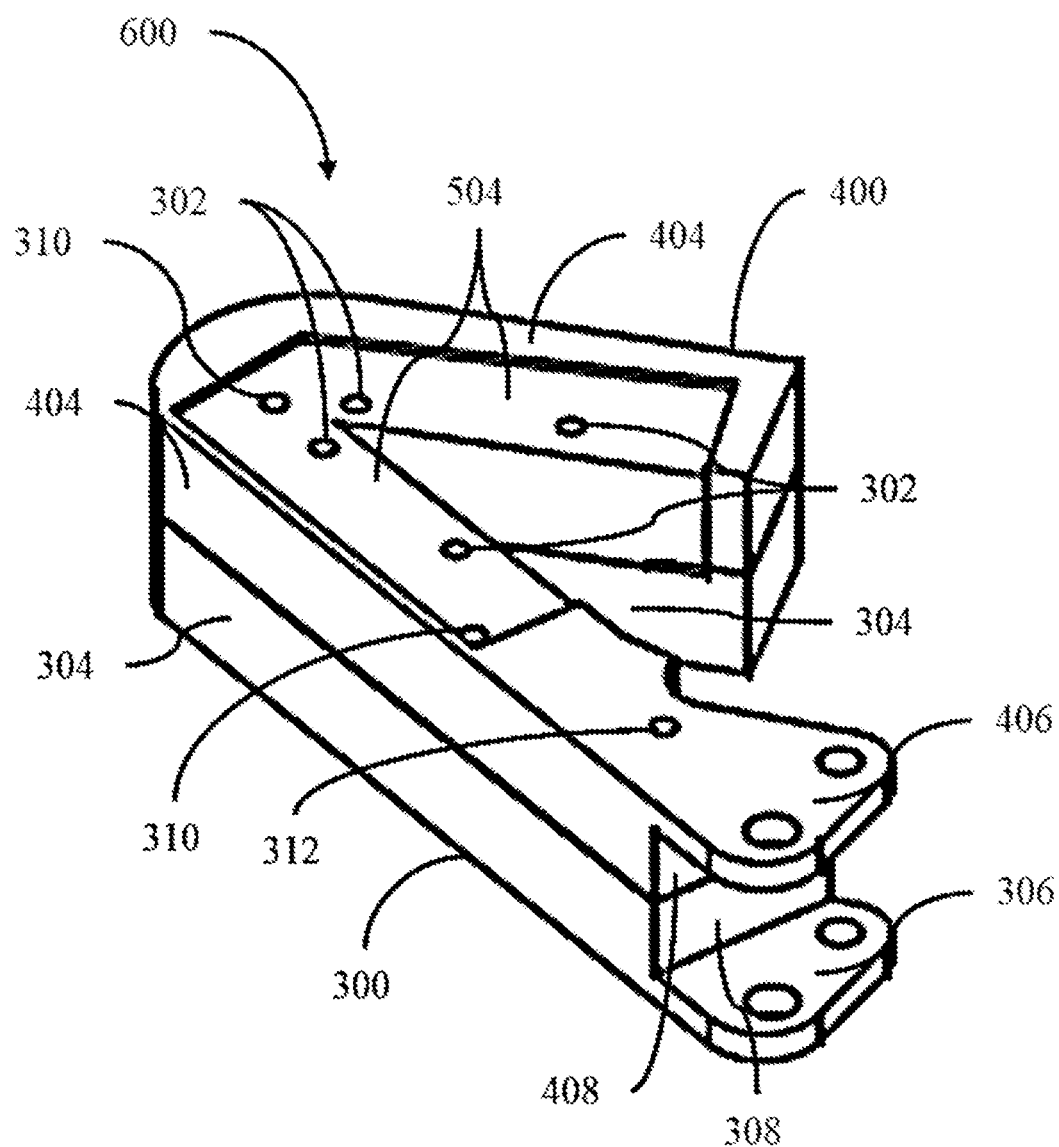

Referring now to FIGS. 6A and 6B, a top view and a perspective view of an example of a cutter 600 is shown. The cutter 600 forms one of the rotating manipulator arms. In this example, the cutter 600 includes blade pocket 300, which forms the bottom portion of the cutter 600, and the connector 400 with the blade cover 500, which forms the top portion of the cutter 600. In FIG. 6A, only the connector 400 with the blade cover 500 is shown from the top view. The blade pocket 300 includes all of the components previously disclosed herein in FIGS. 3A and 3B. Similarly, the connector 400 of the cutter 600 is shown in FIG. 6B, which includes all of the components previously disclosed herein in FIGS. 4A and 4B. In this example of the cutter 600, the blade pocket 300 includes the pocket arm attachment port 306 on the bottom half of the end 308 of the pocket arm 304. The connector 400 with the blade cover 500 includes the casing arm attachment port 406 on the top half of the end 408 of the casing arm 404. In any configuration, the pocket arm attachment port 306 and the casing arm attachment port 406 are located parallel to each other at the same end of the pocket arm 304 and casing arm 404, respectively. The cutter 600 may be attached directly to a rotating manipulator, which is then attached to a ROV.

Figure 7A:
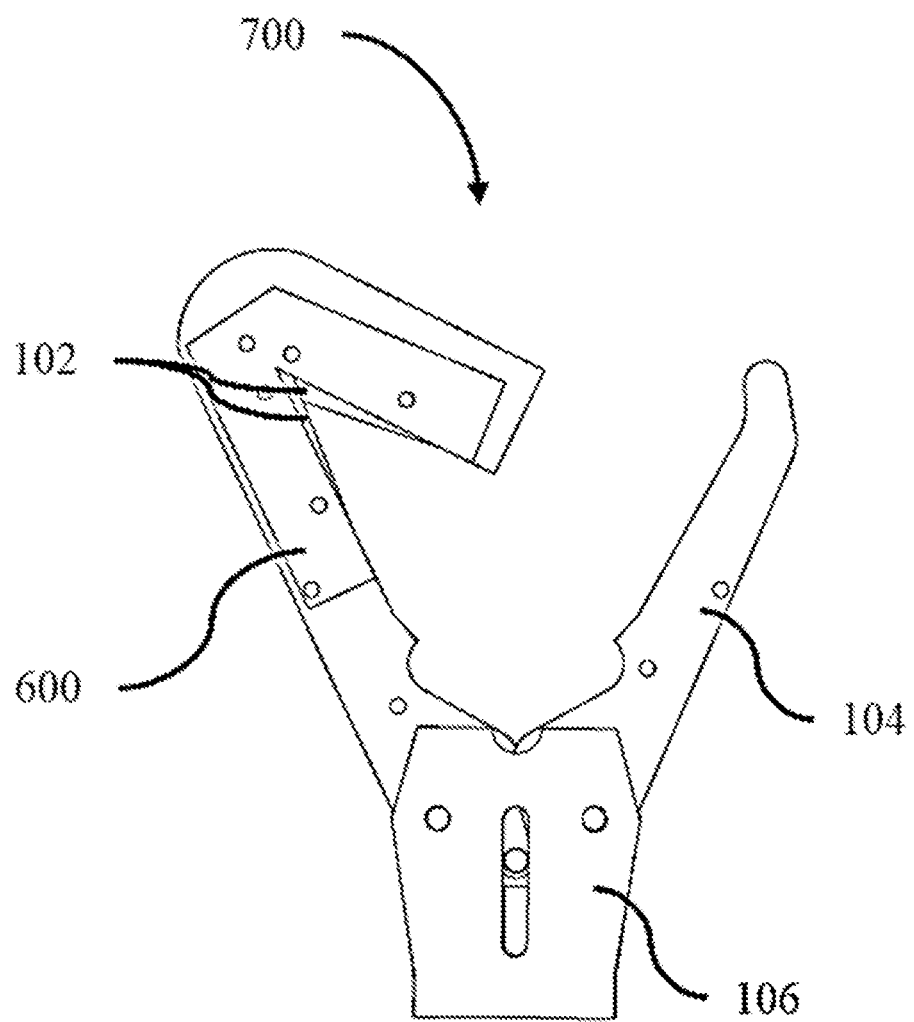
FIGS. 7A and 7B are a top view and perspective view of an example of an open rotating manipulator with a cutter in place of a rotating manipulator arm, respectively.
Figure 7B:
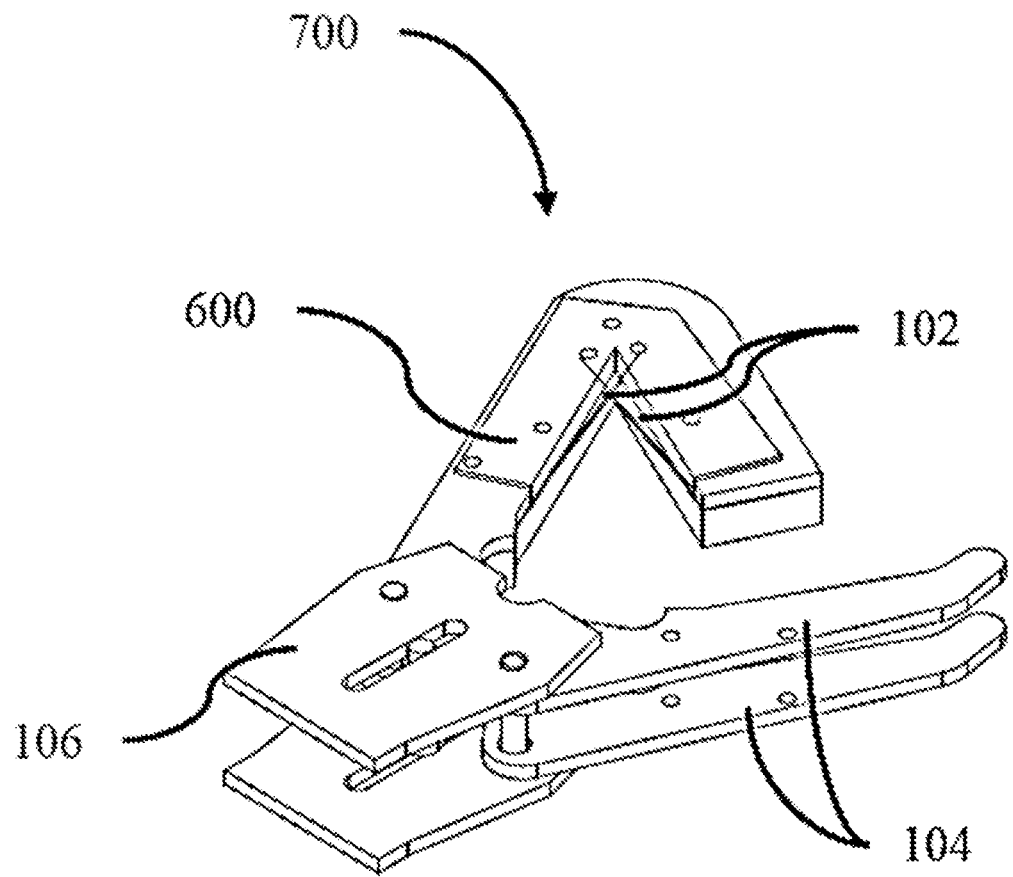

In an example, an ROV with the rotating manipulator including the cutter 600 will approach an underwater line with an open rotating manipulator 700 as shown in FIGS. 7A and 7B. In this example, the open rotating manipulator 700 includes the cutter 600 with two blades 102 and a second rotating manipulator arm 104. Both the cutter 600 and the second rotating manipulator arm 104 are attached to a rotating manipulator attachment 106, which secures the rotating manipulator to the ROV. In this example, the open rotating manipulator 700 with the cutter 600 can be used with the ROV underwater. The open rotating manipulator 700 secured to the ROV will maneuver until an underwater line is between the cutter 600 and the rotating manipulator arm 104. Once the underwater line is between the cutter 600 and the rotating manipulator arm 104, the open rotating manipulator 700 switches to a closed position.

Figure 8A:
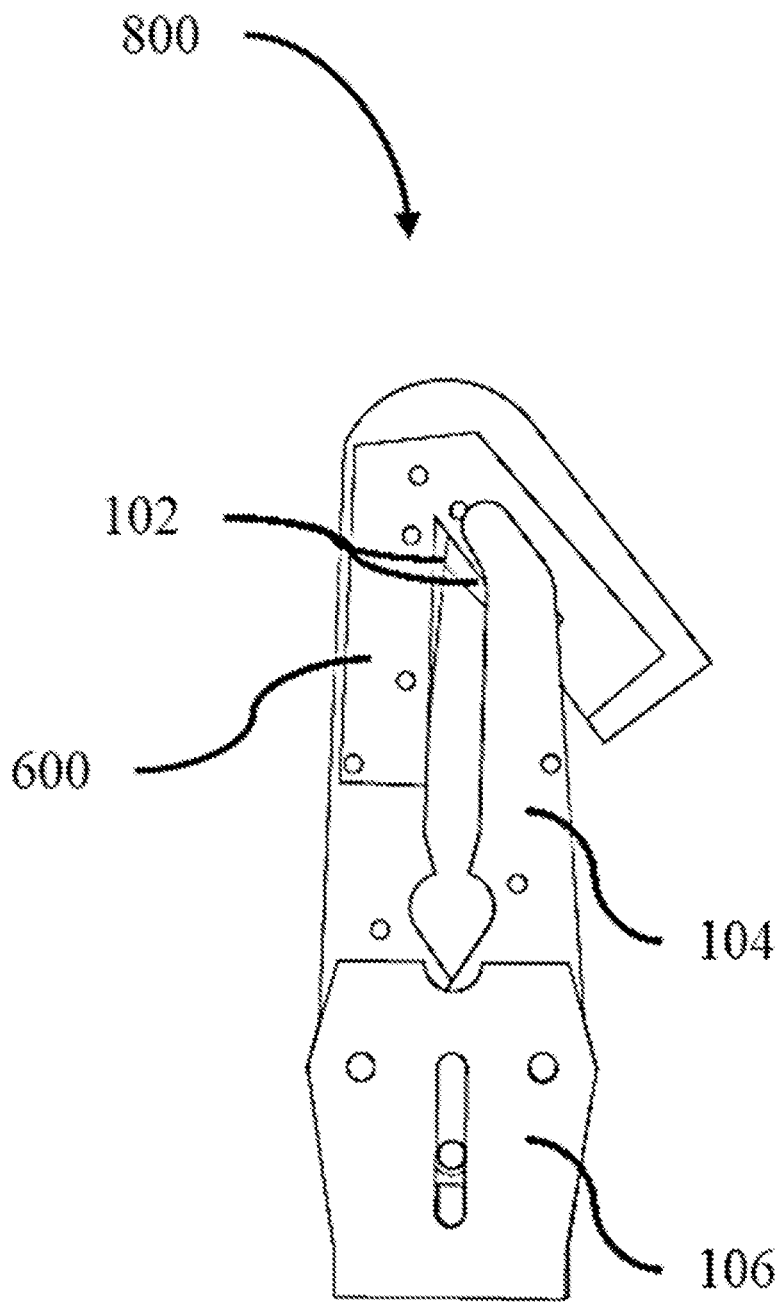
FIGS. 8A and 8B are a top view and perspective view of an example of a closed rotating manipulator with a cutter in place of a rotating manipulator arm, respectively.
Figure 8B:
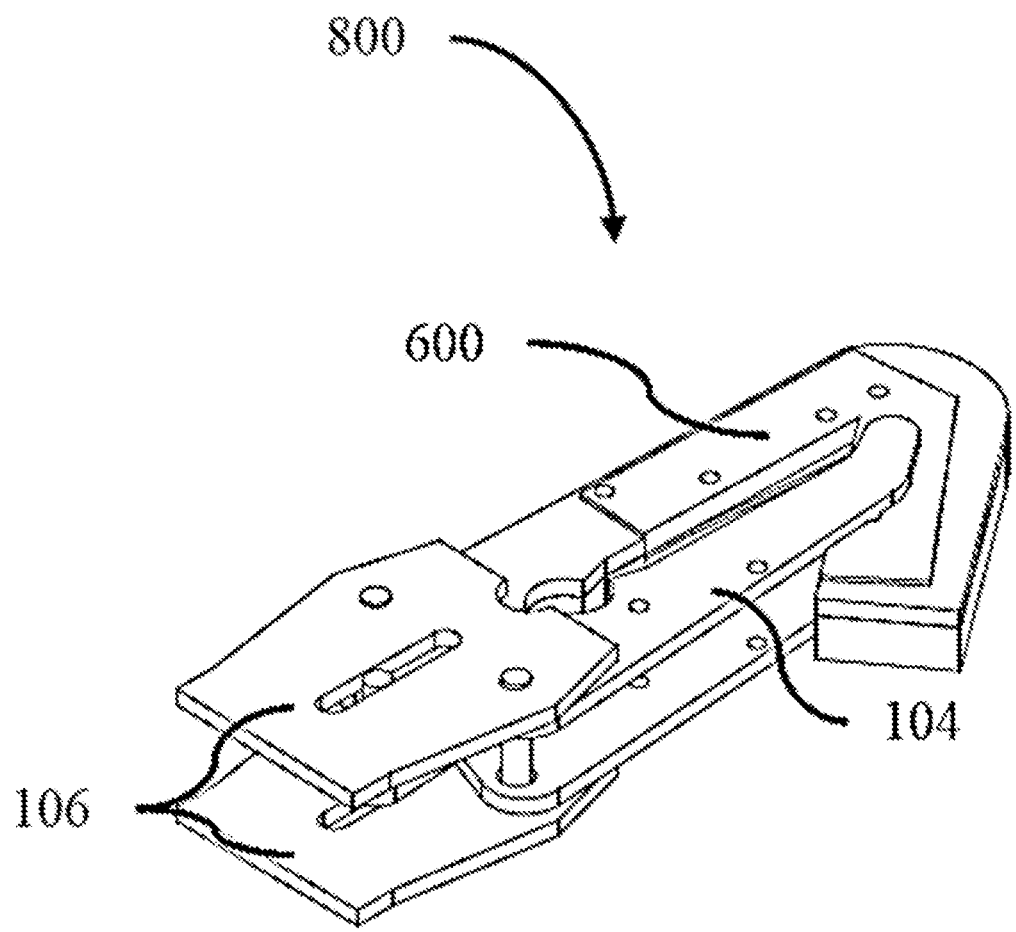

In FIGS. 8A and 8B, a closed rotating manipulator 800 is shown. In this example, the closed rotating manipulator 800 includes the cutter 600 with two blades 102 (shown in FIG. 6A only) and the second rotating manipulator arm 104. Both the cutter 600 and the second rotating manipulator arm 104 are attached to a rotating manipulator attachment 106, which secures the rotating manipulator to the ROV. In this example, the closed rotating manipulator 800 secured to the ROV is enclosed around an underwater line, which would be positioned between the cutter 600 and the rotating manipulator arm 104. The ROV would then use thrusters to move away from the underwater line and pull the blades 102 against the underwater line until the line is cut.

The cutter 600 does not use linear actuators to cut the underwater line. The underwater line cutting tool is capable of cutting an underwater line with a diameter equal to or less than 1 inch or an underwater line made from HMPE. The cutter 600 may be made of any 3D printable plastic or metal. In an example, the cutter 600, including the blade pocket 300, the connector 400, and the blade cover 500 are made from a material selected from the group consisting of high-density polyethylene, aluminum, titanium, stainless steel, polyvinyl chloride, acrylonitrile butadiene styrene, and combinations thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 inch to about 1 inch should be interpreted to include not only the explicitly recited limits of from about 0.1 inches to about 1 inch, but also to include individual values, such as 0.3 inches, 0.7 inches, 0.9 inches, etc., and sub-ranges, such as from about 0.5 inches to about 0.75 inches, etc.

In describing and claiming the examples disclosed herein, the singular forms "a", "an", and "the" include plural referents unless the context clearly dictates otherwise.

What is claimed is:

1. A rotating manipulator, comprising:
   four rotating manipulator arms, wherein two rotating manipulator arms of the four rotating manipulator arms are parallel to each other and form a first set of rotating manipulator arms and two other rotating manipulator arms of the four rotating manipulator arms are parallel to each other and form a second set of rotating manipulator arms opposite the first set of rotating manipulator arms;
   a rotating manipulator attachment, wherein the rotating manipulator attachment is capable of attaching to an underwater remotely operated vehicle and the four rotating manipulator arms are attached to the rotating manipulator attachment; and
   a blade holder with two stationary arms in a V-shaped configuration including at least one blade attached to one of two stationary arms, wherein the blade holder is attached parallel, via one stationary arm, to the first set or second set rotating manipulator arms and the V-shaped configuration of the blade holder opens towards the rotating manipulator attachment.

2. The rotating manipulator of claim 1, wherein the rotating manipulator moves the first set of rotating manipulator arms and the second set of rotating manipulator arms between an open position and a close position to guide an underwater line into the at least one blade.

3. The rotating manipulator of claim 1, wherein the at least one blade is two blades attached to each individual stationary arm of the blade holder.

4. The rotating manipulator of claim 1, wherein the at least one blade is two blades attached to each individual stationary arm of the blade holder and one blade that is capable of being attached to the first set or second set of rotating manipulator arms that does not have the blade holder attached.

5. The rotating manipulator of claim 1, wherein the blade holder is made from a material selected from the group consisting of high-density polyethylene, aluminum, titanium, stainless steel, polyvinyl chloride, acrylonitrile butadiene styrene, and combinations thereof.

6. The rotating manipulator of claim 1, wherein the at least one blade is a utility blade.

7. A rotating manipulator, comprising:
a first rotating manipulator arm, wherein the first rotating manipulator arm includes a set of two rotating manipulator arms parallel to each other;
a cutter, wherein the cutter is a second rotating manipulator arm that includes:
  a blade pocket with two pocket arms in a V-shaped configuration and a pocket arm attachment port at an end of one of the two pocket arms and at least one blade attached to the blade pocket;
  a connector with two casing arms in a V-shaped configuration including a casing arm attachment port at an end of one of the two casing arms, wherein the connector is attached to the blade pocket; and
  a blade cover with two stationary arms in a V-shaped configuration, wherein the blade cover is located within the connector and attached to the blade pocket, thereby attaching the at least one blade to the blade pocket;
  wherein the casing arm attachment port and the pocket arm attachment port are located parallel to each other at the same end of the casing arm and pocket arm, respectively; and
  wherein the V-shaped configuration of the blade pocket, the connector, and the blade cover opens towards the casing arm attachment port and the pocket arm attachment port; and
a rotating manipulator attachment, wherein the rotating manipulator attachment attaches to the casing arm and pocket arm via the casing arm attachment port and pocket arm attachment port and is capable of attaching to an underwater remotely operated vehicle.

8. The rotating manipulator of claim 7, wherein the rotating manipulator moves the cutter and the first rotating manipulator arm between an open position and a close position to guide an underwater line into the at least one blade.

9. The rotating manipulator of claim 7, wherein the at least one blade is two blades attached to each individual pocket arm of the blade pocket.

10. The rotating manipulator of claim 8, wherein the at least one blade is two blades attached to each individual pocket arm of the blade pocket and one blade attached to first rotating manipulator arm.

11. The underwater line cutting tool of claim 7, wherein the cutter is made from a material selected from the group consisting of high-density polyethylene, aluminum, titanium, stainless steel, polyvinyl chloride, acrylonitrile butadiene styrene, and combinations thereof.

12. The underwater line cutting tool of claim 7, wherein the at least one blade a utility blade.

* * * * *